(12) United States Patent
Liu et al.

(10) Patent No.: US 8,135,590 B2
(45) Date of Patent: Mar. 13, 2012

(54) POSITION-DEPENDENT PHONETIC MODELS FOR RELIABLE PRONUNCIATION IDENTIFICATION

(75) Inventors: Peng Liu, Beijing (CN); Yu Shi, Beijing (CN); Frank Kao-ping Soong, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1105 days.

(21) Appl. No.: 11/652,451

(22) Filed: Jan. 11, 2007

(65) Prior Publication Data

US 2008/0172224 A1 Jul. 17, 2008

(51) Int. Cl.
*G10L 15/28* (2006.01)
(52) U.S. Cl. .......... 704/255; 704/243; 704/244
(58) Field of Classification Search .......... 704/254, 704/255, 220, 1, 3–4, 6–7, 9–10, 251, 231, 704/243, 244, 270, 242, 256.4
See application file for complete search history.

(56) References Cited

U.S. PATENT DOCUMENTS

| | | | |
|---|---|---|---|
| 4,833,712 A * | 5/1989 | Bahl et al. ............. | 704/243 |
| 4,977,599 A * | 12/1990 | Bahl et al. ............. | 704/256.4 |
| 5,010,495 A | 4/1991 | Willetts ............. | 364/513.5 |
| 5,621,859 A * | 4/1997 | Schwartz et al. ............. | 704/256 |
| 5,664,059 A * | 9/1997 | Zhao ............. | 704/254 |
| 5,677,988 A * | 10/1997 | Takami et al. ............. | 704/256 |
| 6,073,146 A | 6/2000 | Chen ............. | 707/535 |
| 6,224,383 B1 | 5/2001 | Shannon ............. | 434/156 |
| 6,226,611 B1 | 5/2001 | Neumeyer et al. ............. | 704/246 |
| 6,260,016 B1 | 7/2001 | Holm et al. ............. | 704/260 |
| 6,785,652 B2 * | 8/2004 | Bellegarda et al. ............. | 704/266 |
| 6,963,837 B1 * | 11/2005 | Finke et al. ............. | 704/256 |
| 6,973,427 B2 | 12/2005 | Hwang et al. ............. | 704/249 |
| 7,069,216 B2 * | 6/2006 | DeMoortel et al. ............. | 704/260 |
| 7,092,870 B1 | 8/2006 | Chen et al. ............. | 704/9 |
| 7,107,216 B2 | 9/2006 | Hain ............. | 704/260 |
| 7,299,178 B2 * | 11/2007 | Yoon et al. ............. | 704/251 |
| 7,577,569 B2 * | 8/2009 | Roth et al. ............. | 704/260 |
| 7,590,533 B2 * | 9/2009 | Hwang ............. | 704/231 |
| 2002/0152073 A1 * | 10/2002 | DeMoortel et al. ............. | 704/260 |
| 2004/0172247 A1 * | 9/2004 | Yoon et al. ............. | 704/251 |
| 2006/0020461 A1 * | 1/2006 | Ogawa ............. | 704/251 |
| 2006/0074664 A1 * | 4/2006 | Lam et al. ............. | 704/255 |
| 2006/0229877 A1 | 10/2006 | Tian et al. ............. | 704/267 |
| 2007/0219797 A1 | 9/2007 | Liu et al. ............. | 704/257 |
| 2008/0172224 A1 * | 7/2008 | Liu et al. ............. | 704/220 |
| 2008/0221893 A1 * | 9/2008 | Kaiser ............. | 704/257 |
| 2008/0270129 A1 * | 10/2008 | Colibro et al. ............. | 704/236 |
| 2008/0288256 A1 * | 11/2008 | Agapi et al. ............. | 704/260 |

FOREIGN PATENT DOCUMENTS

WO  WO 2004/114279  12/2004

OTHER PUBLICATIONS

Stephen Cox, Confidence Measures in Speech Recognition, Jun. 2004, PASCAL/AMI Workshop.*

(Continued)

*Primary Examiner* — Huyen X. Vo
(74) *Attorney, Agent, or Firm* — Theodore M. Magee; Westman, Champlin & Kelly, P.A.

(57) ABSTRACT

A representation of a speech signal is received and is decoded to identify a sequence of position-dependent phonetic tokens wherein each token comprises a phone and a position indicator that indicates the position of the phone within a syllable.

5 Claims, 6 Drawing Sheets

OTHER PUBLICATIONS

Cetin et al, Multi-rate and Variable-rate Modeling of Speech at phone and syllable Time Scales, ICASSP 2005.*

Hui Jiang, Confidence Measures for Speech Recognition: a Survey, 2005, Speech Communication.*

E. Fosler-Lussier, "Contextual word and syllable pronunciation models", in Proceedings of the 1999 IEEE ASRU Workshop, Keystone, Colorado, 1999.

A. Sethy, S. Narayanan, and S. Parthasarathy, "Syllable-based recognition of spoken names," in ISCA Pronunciation Modeling and Lexicon Adaptation Workshop, 2002.

I. Kopecek, "Speech Recognition and Syllable Segments"; in Proceedings of the Worshop on Text, Speech and Dialogue—TSD '99, Lectures Notes in Artificial Intelligence 1692, Springer-Verlag, 1999, pp. 203-208.

Hackett et al., "Comparison of Word-Based and Syllable-Based Retrieval for Tibetan", Proceedings of the fifth international workshop on on Information retrieval with Asian languages, pp. 197-198, (2000).

P. Liu et al. "Background Model Based Posterior Probability for Measureing Confidence." Interspeech 2005.

* cited by examiner

US 8,135,590 B2

POSITION-DEPENDENT PHONETIC MODELS FOR RELIABLE PRONUNCIATION IDENTIFICATION

BACKGROUND

During speech recognition, a speech signal is decoded to identify text that the speech signal represents. In particular, decoding involves identifying a sequence of speech units from the frames of a speech signal. In the art, various sized speech units have been used in speech recognition including words, syllables and phones. In principle, larger units such as words lead to better speech recognition reliability than smaller units such as phones because the larger units place greater restrictions on the possible sequences of speech units that may be identified from the speech signal. For example, speech recognition performed on the word level will not produce words that are not found in the language. However, speech recognition performed on the phone level could produce a sequence of phones that does not represent a word in the language.

Although larger units lead to better reliability they can also be negatively affected by speech signals that include words that are not present in a lexicon, known as out-of-vocabulary words. When an out-of-vocabulary word is in the speech signal, a word-based speech recognition system is forced to identify another word in place of the correct out-of-vocabulary word resulting in a recognition error. Generally, if 1% of all words in a language are out-of-vocabulary, there will be a 2-3% increase in word error rate in speech recognition. Phone-level speech recognition, on the other hand, is able to properly decode phone sequences for words even if the words are not found in a lexicon.

Syllables provide a middle ground between the flexibility provided by phone-level speech recognition and the reliability provided by word-level recognition. One issue in adopting syllables as speech recognition units is that the set of syllables for some languages is quite large. For example, in English, there are more than 20,000 syllables. Moreover, it is difficult to list all of the legal syllables based on a specific corpus. Thus, syllables can suffer from the out-of-vocabulary problem that affects word-based speech recognition.

The discussion above is merely provided for general background information and is not intended to be used as an aid in determining the scope of the claimed subject matter.

SUMMARY

A representation of a speech signal is received and is decoded to identify a sequence of position-dependent phonetic tokens wherein each token comprises a phone and a position indicator that indicates the position of the phone within a syllable.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Embodiments described herein train and utilize a position-dependent phonetic language model that describes the probability of sequences of position-dependent phonetic tokens that each consist of a phone and a syllable position indicator. The syllable position indicator indicates the position of the phone within a syllable. Under one embodiment, there are six possible position indicators including:

:s, which represents the start phone at the beginning of the syllable;
:e, which represents the end phone at the end of a syllable
:o, which represents an onset consonant, wherein an onset consonant is a consonant after the start phone but before the vowel of the syllable;
:c, which represents a coda consonant, wherein a coda consonant is a consonant after the vowel of the syllable but before the end phone of the syllable;
:n, which represents the vowel within a multi-phone syllable; and
:m, which represents a single vowel syllable.

Examples of position-dependent phonetic representations of the words "bed", "string", and "idea" are:
"bed"->"b:s e:n d:e"
"string"->"s:s t:o r:o i:n ng:e"
"idea"->"ai:m d:s ie:e"

In the examples above, each word is represented by a sequence of position-dependent phonetic tokens where each phonetic token is defined as phone:position_indicator. In the examples above, bed and strings represent one-syllable words and idea represents a two-syllable word.

As described in more detail below, the position-dependent phonetic tokens can be used to train a statistical position-dependent phonetic language model that describes the probability of sequences of the position-dependent phonetic tokens and the probabilities of individual position-dependent phonetic tokens. Because the position-dependent phonetic tokens include information about the within-syllable position of the phones, the language model constructed from these tokens captures this position information from the training data used to form the language model. As a result, the phonetic token language model provides higher probabilities for sequences of phonetic tokens that define legal syllables for a language. As such, the language model provides the stability found in syllable-based and word-based recognition while at the same time providing flexibility for out-of-vocabulary words and syllables. In addition, the position-dependent phonetic language model does not require a lexicon of syllables. As result, it is more compact than using a lexicon of syllables.

Figure 1:
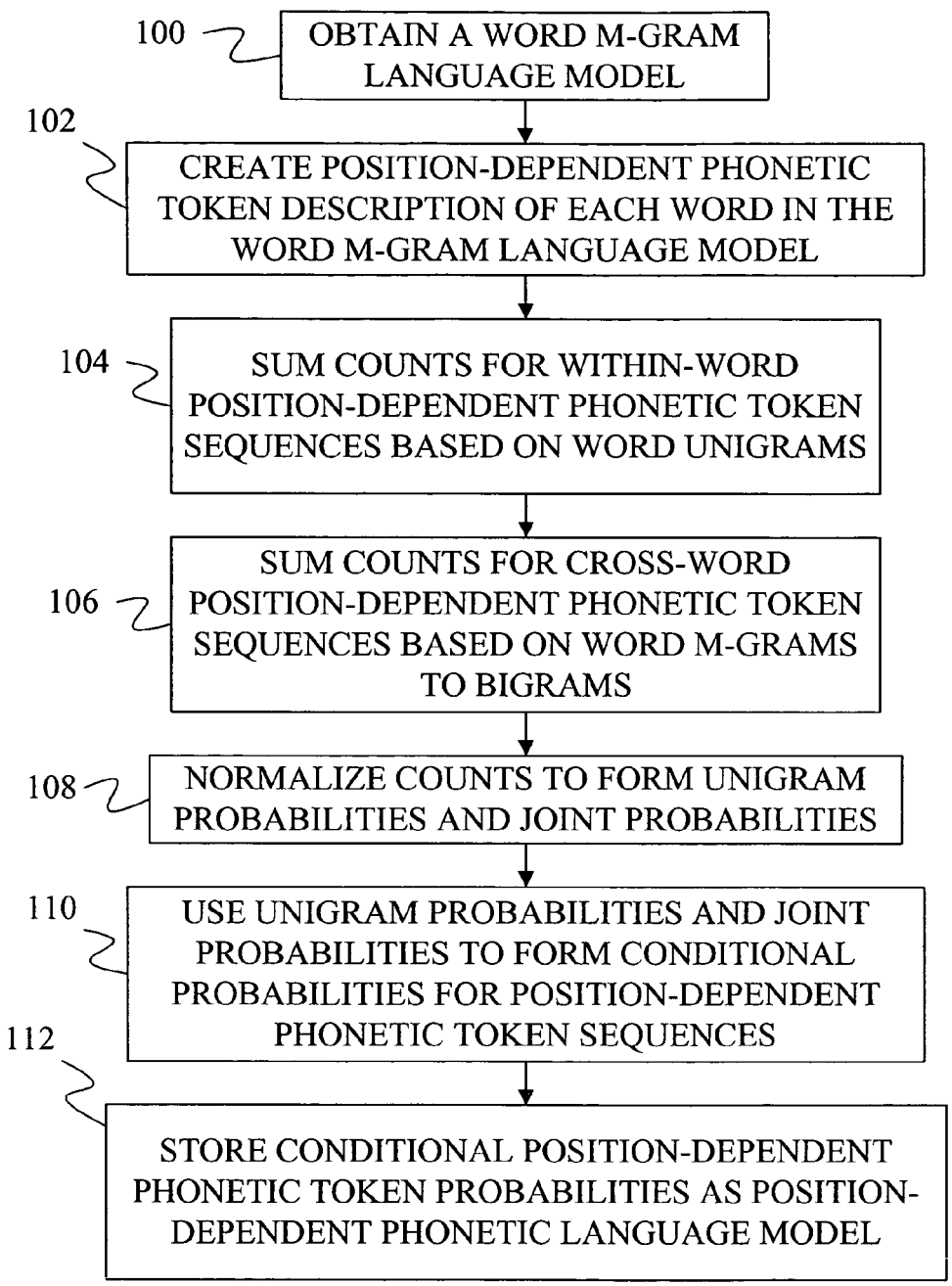
FIG. 1 is a flow diagram for training a position-dependent phonetic language model.
Figure 2:
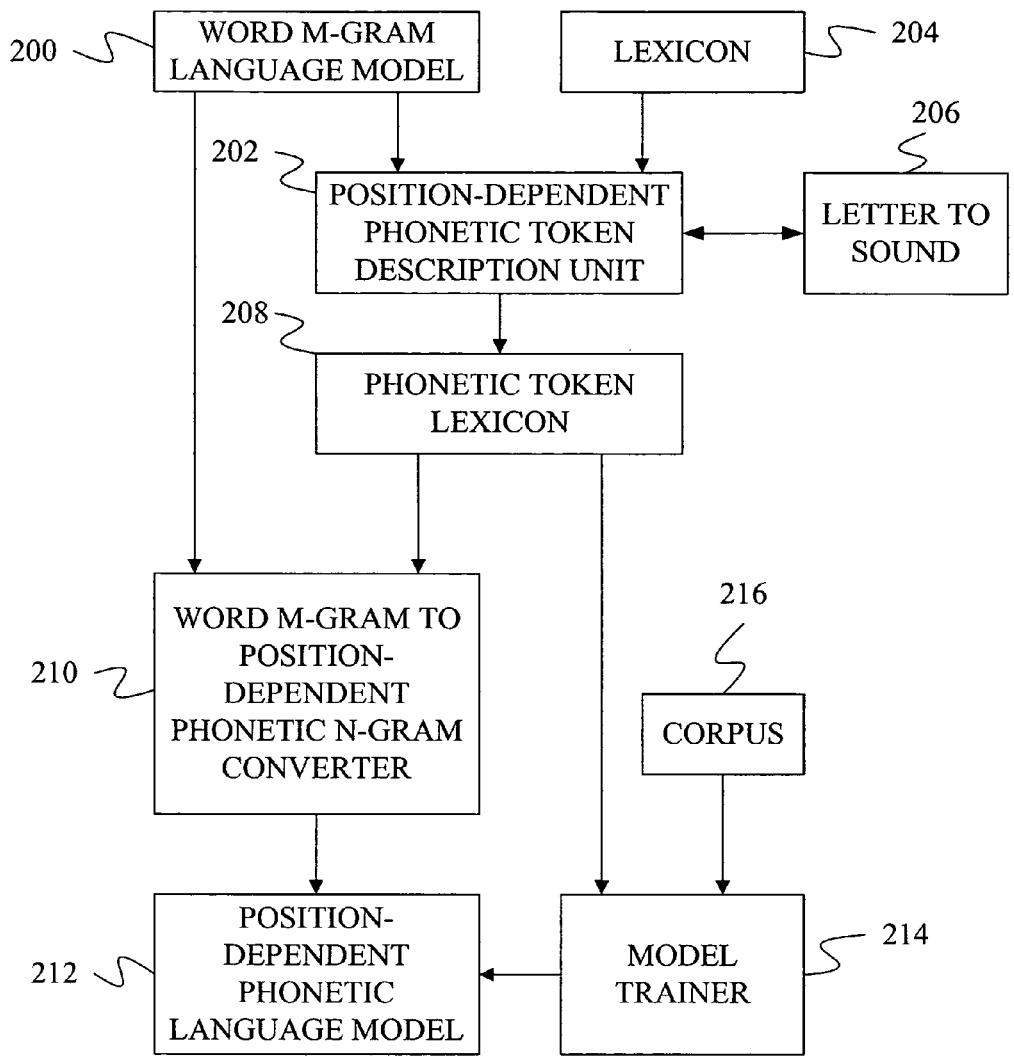
FIG. 2 is a block diagram of elements used to train a position-dependent phonetic language model.

FIG. 1 provides a flow diagram of a method of training a position-dependent phonetic language model under one embodiment. FIG. 2 provides a block diagram of elements in the method of FIG. 1 and additional elements used in an alternative method for training the position-dependent phonetic language model.

In step 100, a word m-gram language model 200 is obtained. Under one embodiment, the word m-gram language model is a tri-gram language model that provides the probability of a current word given two preceding words. Under several embodiments, the word m-gram language models includes smoothing parameters that describe (m-1)-gram probabilities to unigram probabilities. For example, a word trigram language model of such embodiments would include probabilities for trigrams, bigrams and unigrams.

At step 102, a position-dependent phonetic token description of each word in the word m-gram is formed by applying the words of word m-gram 200 to a position-dependent phonetic token description unit 202. Phonetic description unit 202 forms the position-dependent phonetic token description of each word by first locating a phonetic and syllabic description of the word in a lexicon 204. Specifically, lexicon 204 includes a description of the sequence of phones that form each word as well as the syllable boundaries of each word. If a word in word m-gram 200 is not present in lexicon 204, a letter-to-sound unit 206 can be used, which creates a phonetic description based on the orthographic spelling of the word using statistical models and phonetic rules. In addition, letter-to-sound unit 206 identifies the syllable boundaries within a word.

Given the phonetic description and the syllable boundaries for a word, position-dependent phonetic token description unit 202 identifies the position of each phone within each syllable and assigns a position indicator to the phone based on its position. Under one embodiment, this procedure is done by first applying the single vowel indicator, :m, to any syllable that contains only one phone consisting of a vowel. Next, in the remaining syllables, the first phone and the last phone are given the start position indicator, :s, and the end position indicator, :e, respectively. Next, within each syllable, the middle vowel phone is located using a list of allowed vowel phones. Under one embodiment, diphthongs are permitted as the middle vowel. Each located middle vowel is assigned the middle vowel position indicator :n. Any consonants between the middle vowel and the start phone are then given the onset consonant position indicator, :o. Any consonants after the middle vowel and before the end phone are given the coda consonant position indicator, :c. The resulting position-dependent phonetic token sequence is then stored along with the orthographic representation of the word in a phonetic token lexicon 208.

At step 104, a word m-gram to position-dependent phonetic n-gram converter 210 forms counts for sequences of position-dependent phonetic tokens that are bounded within individual words based on the unigram probabilities of those words. In particular, counts are formed as:

$$count_u(x - \text{gram}) = \sum_\phi p(w_i) \qquad \text{EQ. 1}$$

where a separate count is determine for each x-gram, an individual x-gram represents a sequence of position-dependent phonetic tokens, where a sequence can contain a single position-dependent phonetic token up to n position-dependent phonetic tokens for an n-gram position-dependent phonetic token language model, $\phi$ represents the set of words in the word language model that contain the entire x-gram, and $p(w_i)$ is the unigram probability for word $w_i$ that contains the x-gram.

At step 106, counts are formed for cross-word position-dependent phonetic token sequences based on probabilities for sequences of words that the phonetic token sequences span. In particular, the counts are formed as:

$$count_m(x - \text{gram}) = \sum_\theta p(w_m, \ldots, w_1) \qquad \text{EQ. 2}$$

where a separate count is formed for each x-gram, an x-gram represents a sequence of position-dependent phonetic tokens that can include from one to n position-dependent phonetic tokens, $\theta$ represents the set of word sequences where the x-gram spans from the first word in the word sequence to the last word in the word sequence and $p(w_m, \ldots, w_1)$ is the joint probability of words in the word sequence $w_m, \ldots, w_1$.

For a word bigram, the joint probability is defined as:

$$p(w_2, \ldots, w_1) = p(w_2|w_1)p(w_1) \qquad \text{EQ. 3}$$

where $p(w_2|w_1)$ is the conditional bigram probability from the word n-gram language model and $p(w_1)$ is the unigram probability.

For longer word sequences, the joint probability is defined generally as:

$$p(w_m, \ldots, w_1) = p(w_m|w_{m-1}, \ldots, w_1)p(w_{m-1}|w_{m-2}, \ldots, w_1) \ldots p(w_1) \qquad \text{EQ. 4}$$

At step 108, the counts for the x-grams are normalized to form unigram probabilities and joint probabilities. Specifically, the counts for the x-grams are normalized as:

$$p(x - \text{gram}) = \frac{count_u(x - \text{gram}) + count_m(x - \text{gram})}{\sum_{x-gram} [count_n(x - \text{gram}) + count_m(x - \text{gram})]} \qquad \text{EQ. 5}$$

where p(x-gram) is the joint probability of the position-dependent phonetic tokens found in the x-gram, the summation in the denominator on the right hand side of EQ. 5 is performed over all x-grams that have the same value of x as the x-gram in the numerator. For example, if the joint probability of a bigram is being determined, the summation in the denominator would be across all bigram position-dependent phonetic token sequences. Thus, counts for individual position-dependent phonetic tokens are normalized such that the sum of the probabilities for individual phonetic tokens is 1, the sum of all joint probabilities for pairs of phonetic tokens is 1 and so forth up to the sum of all n-gram joint probabilities equaling 1.

At step 110, conditional probabilities are formed from the joint probabilities. For example, the conditional probability for a bigram would be computed as:

$$p(ph_2|ph_1) = \frac{p(ph_1, ph_2)}{p(ph_1)} \qquad \text{EQ. 6}$$

where $p(ph_2|ph_1)$ is the conditional bigram probability of position-dependent phonetic token $ph_2$ given position-dependent phonetic token $ph_1$, $p(ph_1, ph_2)$ is the joint probability for the bigram $ph_1$, $ph_2$ calculated in EQ. 5 and $p(ph_1)$ is the unigram probability for position-dependent phonetic token $ph_1$ as calculated in EQ. 5.

Similarly, the trigram conditional probability can be calculated as:

$$p(ph_3|ph_2 ph_1) = \frac{p(ph_1, ph_2, ph_3)}{p(ph_2|ph_1)p(h_1)} \quad \text{EQ. 7}$$

where $p(ph_3|ph_2 ph_1)$ is the trigram conditional probability, $p(ph_1,ph_2,ph_3)$ is the joint probability for the trigram calculated in EQ. 5 above, and the remaining values are taken from EQ. 6. The calculation of larger n-grams can be computed by extending the examples of EQS. 6 and 7.

At step 112, the computed conditional probabilities for the position-dependent phonetic token n-grams to unigrams are then stored as position dependent phonetic language model 212.

In an alternative embodiment, the conditional probabilities for position-dependent phonetic language model 212 may be computed by a model trainer 214 using the phonetic token lexicon 208 and a corpus 216. For each word in corpus 216, model trainer 214 obtains a position-dependent phonetic token description of the word using phonetic token lexicon 208. Under such embodiments, phonetic token lexicon 208 is trained based on lexicon 204 alone, without reference to a word m-gram language model. Using the position-dependent phonetic token description of each word in corpus 216, model trainer 214 collects statistics on the probability of various position-dependent phonetic token sequences. These statistics are then used to set the conditional probabilities of each sequence, which are then stored in position-dependent phonetic language model 212.

In the discussion above, a word m-gram language model is used to construct a position-dependent phonetic token n-gram language model. Under some embodiments, m and n are equal to each other. In other embodiments, m is greater than n or n is greater than m.

Figure 3:
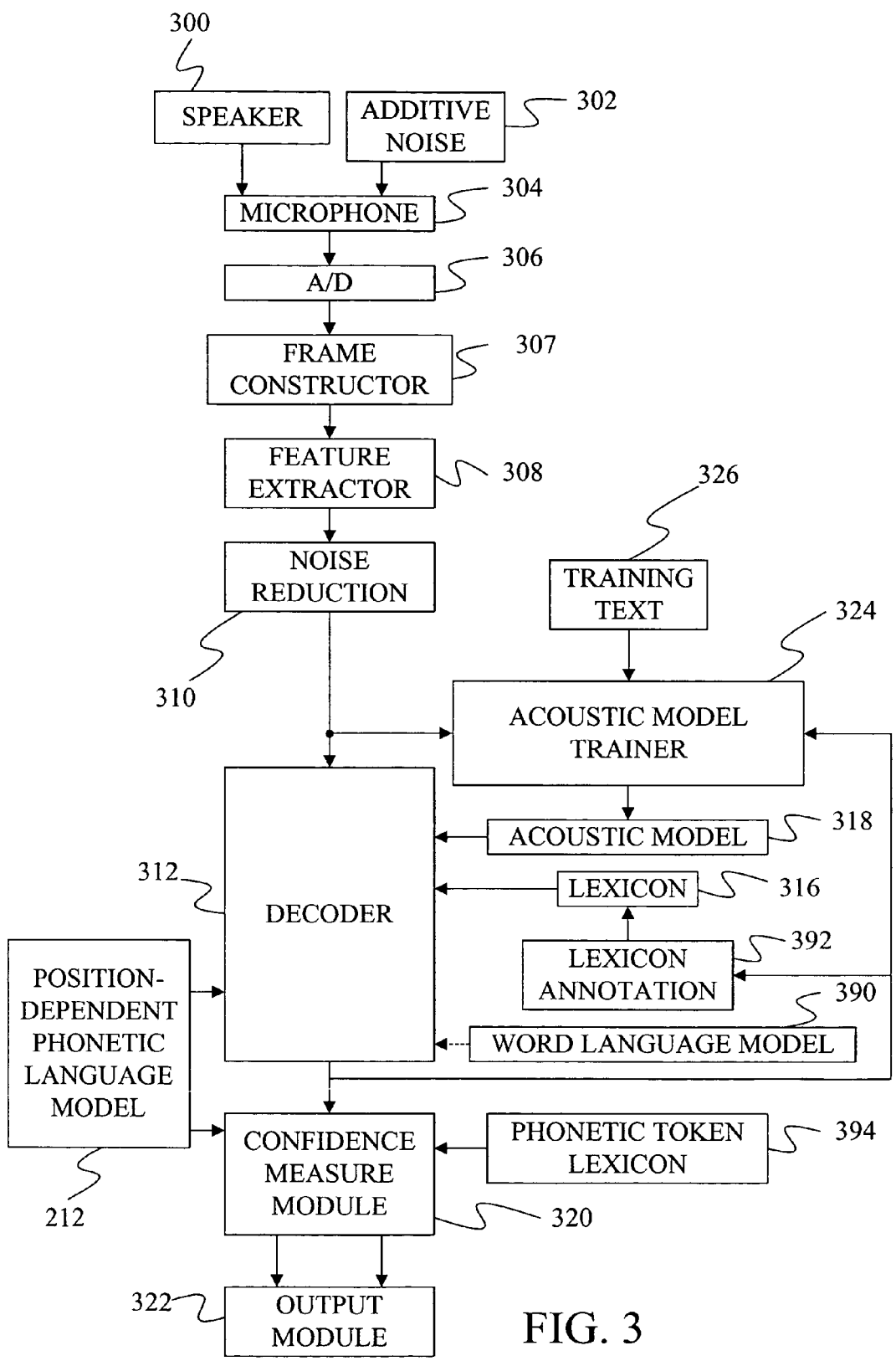
FIG. 3 is a block diagram of elements in a speech processing system that utilizes a position-dependent phonetic language model.

Once the position-dependent phonetic language model has been constructed, it can be used in a number of tasks including providing a confidence measure for speech recognition, decoding speech during discriminative training of acoustic models and decoding speech to identify pronunciations that can be added to a lexicon. FIG. 3 provides a block diagram of a speech processing system in which these various methods may be practiced.

In FIG. 3, a speaker 300, either a trainer or a user, speaks into a microphone 304. Microphone 304 also receives additive noise from one or more noise sources 302. The audio signals detected by microphone 304 are converted into electrical signals that are provided to analog-to-digital converter 306.

A-to-D converter 306 converts the analog signals from microphone 304 into a series of digital values. In several embodiments, A-to-D converter 306 samples the analog signal at 16 kHz with 16 bits per sample, thereby creating 32 kilobytes of speech data per second. These digital values are provided to a frame constructor 307, which, in one embodiment, groups the values into 25 millisecond frames that start 10 milliseconds apart.

The frames of data created by frame constructor 307 are provided to feature extractor 308, which extracts a feature from each frame. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that other modules may be used.

The feature extraction module produces a stream of feature vectors that is provided to noise reduction module 310, which removes noise from the feature vectors.

The output of noise reduction module 310 is a series of "clean" feature vectors that represent the speech signal. During some types of training, this series of "clean" feature vectors is provided to an acoustic model trainer 324, which uses the "clean" feature vectors and a training text 326 to train an acoustic model 318. Techniques for training such models are known in the art. A discriminative training technique that utilizes the position dependent-phonetic language model during training is described further below.

The "clean" feature vectors are also provided to a decoder 312, which identifies likely sequences of speech units based on the stream of feature vectors, a lexicon 314, the acoustic model 318 and either position-dependent phonetic language model 212 or word language model 390.

The sequences of speech units are provided to a confidence measure module 320. Confidence measure module 320 identifies which speech units are most likely to have been improperly identified by the speech recognizer. Under one embodiment, confidence measure module 320 identifies the possibly erroneous speech units by using position-dependent phonetic language model 212. Confidence measure module 320 then provides the sequences speech units to an output module 322 along with identifiers indicating which speech units may have been improperly identified.

Figure 4:
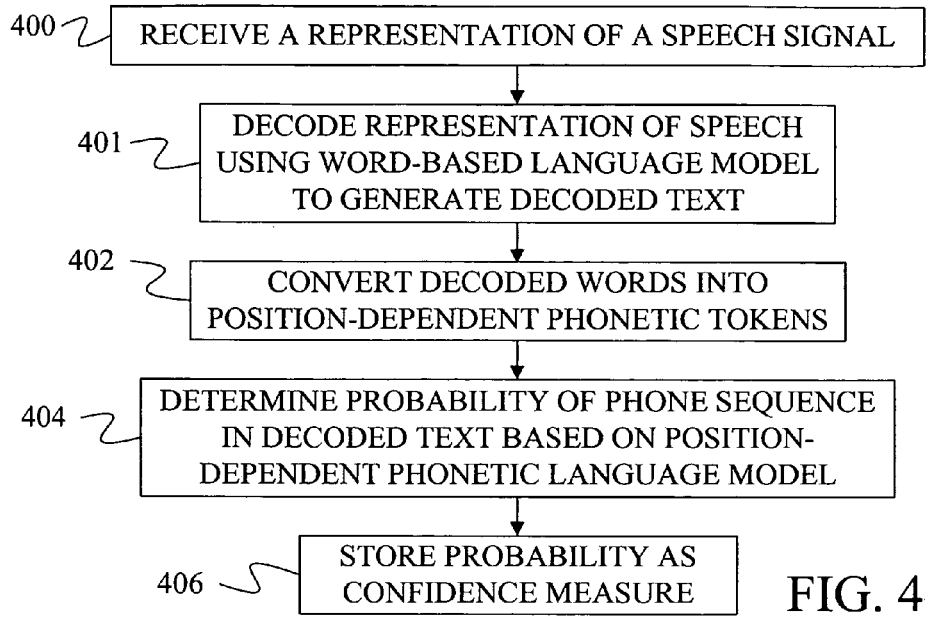
FIG. 4 is a method of using a position-dependent phonetic language model as a confidence measure.

FIG. 4 provides a flow diagram for using the position-dependent phonetic language model 212 to determine a confidence measure for a decoded sequence from decoder 312. At step 400, a representation of the speech signal is received at decoder 312. In FIG. 3, this representation comprises a sequence of noise-reduced feature vectors. However, other representations may be used. At step 401, the speech signal is decoded by decoder 312 using word language model 390 and acoustic model 318. At step 402, each of the words in the decoded sequence of words is converted into a sequence of position-dependent phonetic tokens by confidence measure module 320 using phonetic token lexicon 394, which provides a position-dependent phonetic token description of each word in lexicon 316. The conversion produces a sequence of position-dependent phonetic tokens that spans the utterance that was decoded and that is separated into individual sequences for each word. At step 404, probabilities for sub-sequences of position-dependent phonetic tokens in the complete sequence produced by converting the decoded words is determined based on the position-dependent phonetic language model 212. These probabilities can include probabilities for individual syllables, multi-syllable segments, individual words, or multi-word segments, including the entire decoded word sequence. At step 406, the probabilities are stored as the confidence measures for the decoded sequence of words. Thus, the position-dependent phonetic language model provides a second scoring of the words recognized by decoder 312 that can be used as a confidence measure for individual syllables, multi-syllable segments, individual words, and multi-word segments.

Figure 5:
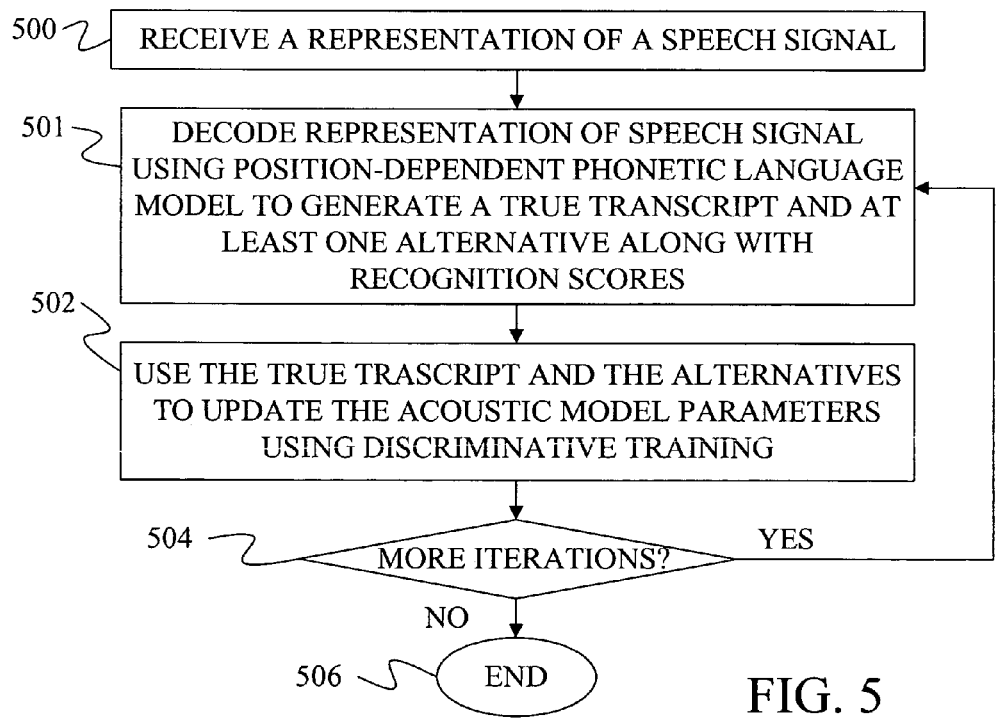
FIG. 5 is a flow diagram of a method of performing discriminative training using a position-dependent phonetic language model.

Under a separate embodiment, a position-dependent phonetic language model may be used during discriminative training of acoustic model 318. FIG. 5 provides a flow diagram of a method of using a position-dependent phonetic language model during discriminative training. At step 500, a representation of a speech signal is received by decoder 312. Under the embodiment of FIG. 3, the representation of the speech signal is a sequence of noise-reduced feature vectors. However, other representations may be used. At step 501, decoder 312 decodes the noise-reduced feature vectors using an initial version of acoustic model 318 and position-dependent phonetic language model 212. During this decoding, decoder 312 produces one sequence of position-dependent phonetic tokens that represents the true transcript of the speech signal and at least one alternative word sequence that includes one or more erroneous phonetic tokens. Decoder 312 also provides scores for both the true transcript and the erroneous alternatives. By using the position-dependent phonetic language model 212 instead of a word language model 390, weaknesses in acoustic model 318 that result in recognition errors are not hidden as much as they would be if a word language model was used because a word language model tends to compensate for weaknesses in acoustic model 318.

At step 502, the true transcript and the alternative sequences are used by acoustic model trainer 324 to perform discriminative training of the acoustic model parameters in acoustic model 318. In some embodiments, the discriminative training uses the recognition scores for the true transcript and the alternatives to define an objective function that is then optimized so that the model parameters discriminate between the true transcript and the alternatives. In other embodiments, acoustic model trainer 324 does not use the recognition scores from decoder 312, but instead develops separate scores based on the true transcript and the alternative sequences and then uses those scores to discriminatively train the acoustic model parameters of acoustic model 318 so that preference is given to the true transcript rather than the alternative sequences.

At step 504, model trainer 324 determines if more iterations of training are needed. If more iterations of training are needed, the process returns to step 500 to decode the speech signal using the new version of acoustic model 318 and position-dependent phonetic language model 212. The process of FIG. 5 continues to iterate through steps 500, 502 and 504 until model trainer 324 determines that no more iterations are needed and the process ends at step 506.

Figure 6:
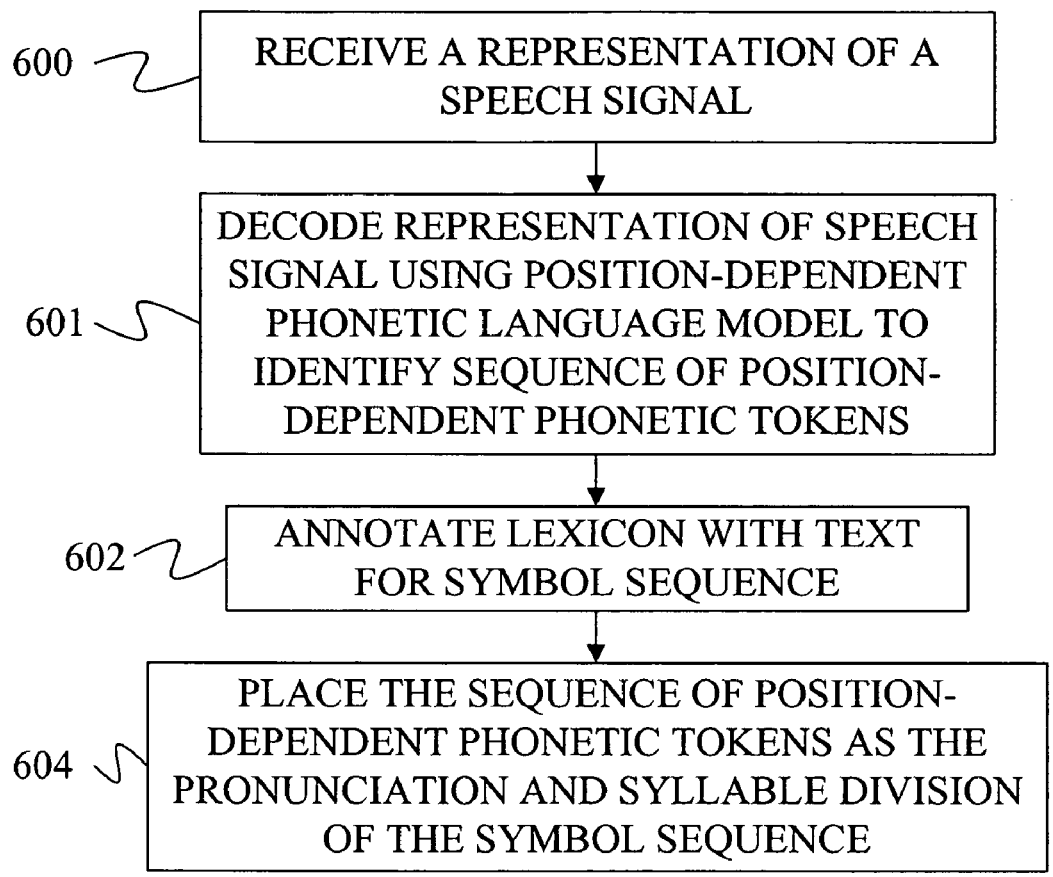
FIG. 6 is a flow diagram of a method of annotating a lexicon with pronunciations using a position-dependent phonetic language model.

In other embodiments, position-dependent phonetic language model 212 is used to annotate a lexicon 316 with pronunciations for words that are difficult to pronounce or for sequences of symbols that have a pronunciation but do not form a word in the language of interest. For example, the following symbol "☺" can have a pronunciation of "smiley face", even though the symbol itself is not part of the English language. FIG. 6 provides a flow diagram for identifying a pronunciation for a collection of symbols.

In step 600, a representation of a speech signal is received by decoder 312. In FIG. 3, this representation is a sequence of noise-reduced feature vectors. However, other representations may be used. At step 601, the representation of the speech signal is decoded using the position-dependent phonetic language model 212 and acoustic model 318 to identify a sequence of position-dependent phonetic tokens. The sequence of position-dependent phonetic tokens is provided to a lexicon annotation unit 392 along with a symbol sequence associated with the pronunciation that is to be added to lexicon 316.

At step 602, lexicon annotation 392 annotates the lexicon with the new symbol sequence. At step 604, lexicon annotation unit 392 places the sequence of position-dependent phonetic tokens as the pronunciation of the symbol sequence. Because the position-dependent phonetic tokens identify the starting phone and ending phone of each syllable in the pronunciation the syllable division for the symbol sequence can be readily identified from the position-dependent phonetic tokens. As such, lexicon annotation unit 392 can easily include the syllable boundaries when adding the position-dependent phonetic tokens to the lexicon by placing a syllable boundary between each end phone and each start phone in the sequence of position-dependent phonetic tokens.

Figure 7:
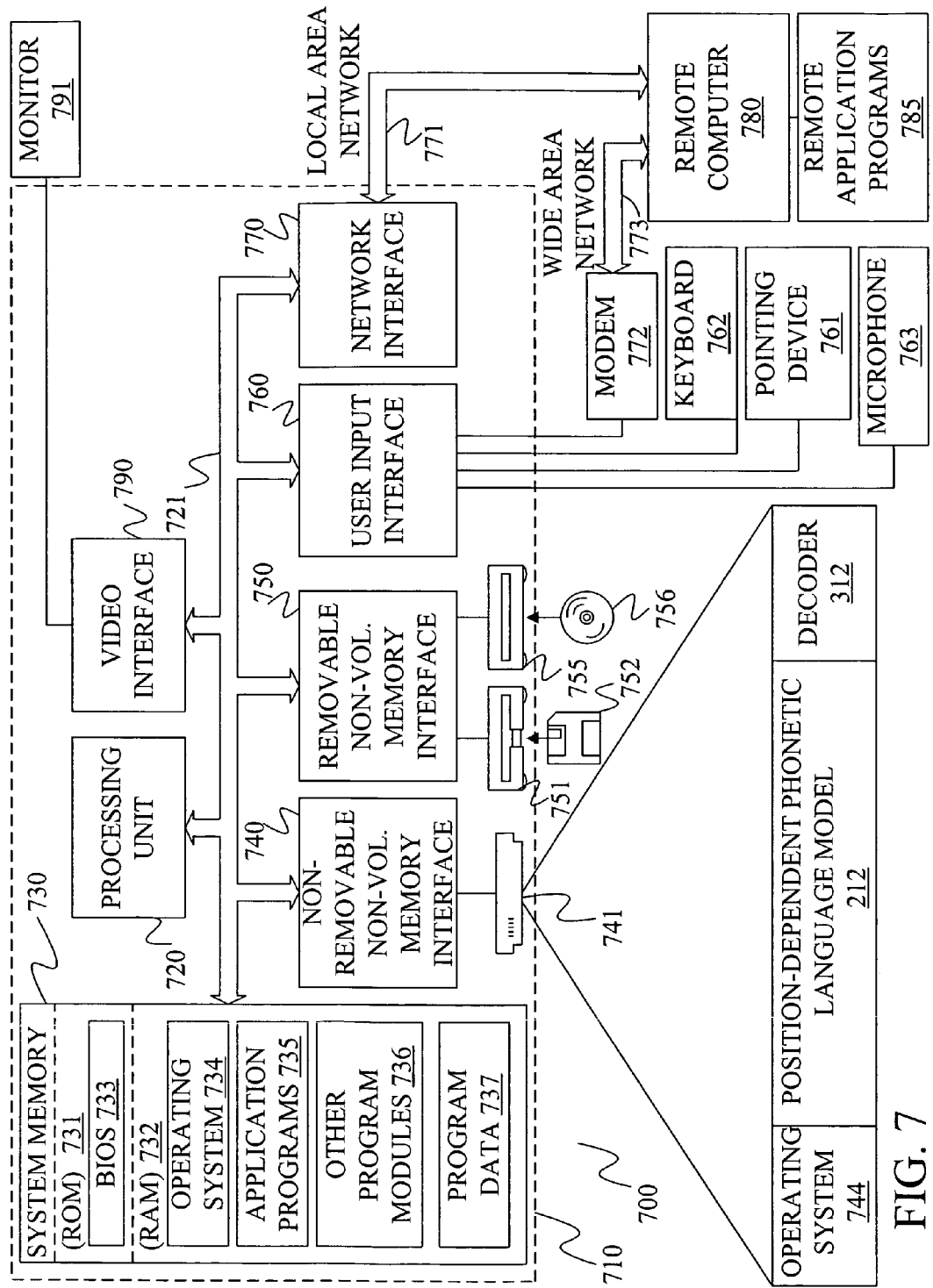
FIG. 7 is a block diagram of a general computing environment in which embodiment may be practiced.

FIG. 7 illustrates an example of a suitable computing system environment 700 on which embodiments may be implemented. The computing system environment 700 is only one example of a suitable computing environment and is not intended to suggest any limitation as to the scope of use or functionality of the claimed subject matter. Neither should the computing environment 700 be interpreted as having any dependency or requirement relating to any one or combination of components illustrated in the exemplary operating environment 700.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 7, an exemplary system for implementing some embodiments includes a general-purpose computing device in the form of a computer 710. Components of computer 710 may include, but are not limited to, a processing unit 720, a system memory 730, and a system bus 721 that couples various system components including the system memory to the processing unit 720.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 610 but computer storage media excludes transmission media such as signals. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, position-dependent phonetic language model 212 and decoder 312.

A user may enter commands and information into the computer 710 through input devices such as a keyboard 762, a microphone 763, and a pointing device 761, such as a mouse, trackball or touch pad. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790.

The computer 710 is operated in a networked environment using logical connections to one or more remote computers, such as a remote computer 780. The remote computer 780 may be a personal computer, a hand-held device, a server, a router, a network PC, a peer device or other common network node, and typically includes many or all of the elements described above relative to the computer 710. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on remote computer 780. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving a representation of a speech signal;
   a processor decoding the representation of the speech signal into a sequence of words using a word language model and an acoustic model;
   a processor converting each word in the sequence of words into a sequence of position-dependent phonetic tokens using a phonetic token lexicon, which provides a position-dependent phonetic token description of each word in a lexicon, wherein each position-dependent phonetic token comprises a phone and a position indicator that indicates the position of the phone within a syllable; and
   a processor determining probabilities for sub-sequences in the sequences of position-dependent phonetic tokens by applying sub-sequences of position-dependent phonetic tokens converted from the sequence of words to a position-dependent phonetic language model that describes probabilities of sequences of position-dependent phonetic tokens comprising a conditional probability of a position-dependent phonetic token given at least two preceding position-dependent phonetic tokens and probabilities of individual position-dependent phonetic tokens.

2. The method of claim 1 further comprising utilizing the at least one probability as a confidence measure.

3. The method of claim 1 wherein at least one position indicator indicates one of a group of syllable positions consisting of onset consonant, and coda consonant.

4. A hardware computer storage medium encoded with a computer program, causing the computer to execute steps comprising:
   decoding a representation of a speech signal using a position-dependent phonetic language model that provides probabilities of sequences of position-dependent phonetic tokens wherein each position-dependent phonetic token comprises a phone and a position identifier that identifies a position within a syllable, wherein decoding produces at least one sequence of position-dependent phonetic tokens;

receiving a symbol represented by a portion of the speech signal, wherein the symbol is not part of the language of a lexicon; and annotating a lexicon by storing a sequence of position-dependent phonetic tokens as a pronunciation for the symbol that is not part of the language of the lexicon, wherein annotating the lexicon further comprises identifying syllable boundaries from the position-dependent phonetic tokens and placing syllable boundaries in the lexicon.

5. The hardware computer storage medium of claim 4 wherein a position identifier is one of a group of position identifiers consisting of onset consonant and coda consonant.

* * * * *